(12) United States Patent
Mimura

(10) Patent No.: US 6,629,554 B2
(45) Date of Patent: Oct. 7, 2003

(54) APPARATUS FOR DETACHING A TIRE FROM A VEHICLE WHEEL AND THE SAME METHOD

(75) Inventor: Yoshio Mimura, Takefu (JP)

(73) Assignee: Onodani Kiko Kabushiki Kaisha, Fukui (JP)

( * ) Notice: Subject to any disclaimer, the term of this patent is extended or adjusted under 35 U.S.C. 154(b) by 5 days.

(21) Appl. No.: 10/110,839

(22) PCT Filed: Oct. 11, 2001

(86) PCT No.: PCT/JP01/08912
§ 371 (c)(1),
(2), (4) Date: Apr. 17, 2002

(87) PCT Pub. No.: WO02/38401
PCT Pub. Date: May 16, 2002

(65) Prior Publication Data
US 2002/0162633 A1 Nov. 7, 2002

(30) Foreign Application Priority Data
Nov. 9, 2000 (JP) .................................... 2000-341694

(51) Int. Cl.[7] ............................................. B60C 25/135
(52) U.S. Cl. ..................... 157/1.24; 157/1.2; 157/1.17
(58) Field of Search ..................... 157/1.24, 1.44, 157/1.28, 1.26, 1.17

(56) References Cited

U.S. PATENT DOCUMENTS 4,209,053 A * 6/1980 du Quesne ............... 157/1.24
4,210,190 A * 7/1980 Hessels ................... 157/1.24
4,230,170 A * 10/1980 Duquesne ................ 157/1.24
6,056,034 A   5/2000 Matnick
6,182,736 B1 * 2/2001 Cunningham et al. ..... 157/1.24
6,227,277 B1 * 5/2001 Corghi .................... 157/1.24
6,422,285 B1 * 7/2002 Gonzaga .................. 157/1.24

FOREIGN PATENT DOCUMENTS

EP    649 763 A1   4/1995
JP    2668138      7/1997

* cited by examiner

Primary Examiner—Lee D. Wilson
(74) Attorney, Agent, or Firm—Ronald R. Snider; Snider & Associates

(57) ABSTRACT

An apparatus and method for detaching a bead of a tire, has a tire bead separation shoe (1), which has a wedge portion (12) which engages a rim edge (WR) of a wheel (W) having a tire (T). The rim is mounted on a turntable (R). The wedge portion (12) is between the rim edge and the tire bead (TB) and the tire bead fold-back portion (11), and is arranged above the turntable such that it moves up and down. A thrusting rod (4) having a claw (41) provided at its tip end portion is operated when the said wedge portion (12) is shoved between the tire bead (TB) and the rim edge (WR) of the wheel. The claw (41) is shoved between the tire bead and the rim edge. A part of the tire bead is squeezed out of the wheel by the claw onto the bead fold back portion (11). The turntable is revolved so as to smoothly detach the whole circumference of the tire bead (TB) from the rim edge of the tire (W).

20 Claims, 7 Drawing Sheets (a)

(b)

(a)

(b)

(a)

(b)

(a)

(b)

APPARATUS FOR DETACHING A TIRE FROM A VEHICLE WHEEL AND THE SAME METHOD

TECHNICAL FIELD

This invention relates to an improvement on the replacement technique of a tire from the vehicle wheel, in more details, pertaining to such apparatus that enables the bead of even a tire, the ratio or nominal aspect ratio of which sectional height to the sectional width thereof is small, said nominal aspect ratio being expressed with the percentage of fivefold numerals, and the rigidity of which side portions is high, to be detached from the rim edge of the wheel not by manual labor, but by a mechanical operation in a safe and efficient manner and the same method.

BACKGROUND ART

The wheels of the vehicles for land transportation, on which tires are directly mounted without filling a tube inside, prevail over in the market. The replacement of such tubeless tire as mentioned above, in which a tire is detached from the wheel, requires hard manual labor and higher skill on the part of the operators in comparison with the replacement work of the tire with a tube filled inside, and is prone to injure the operators. Thus, various types of tire replacement devices have been developed to date to lighten the burden on the part of the operators as well as to secure their safety.

One example of such prior tire replacement devices is disclosed in Japanese Patent Registration No.2668318 entitled "Method for detaching a tire of small nominal aspect ratio from the vehicle wheel and the same apparatus" in the name of the present inventor, which method comprises the steps of fixing a wheel round which a tire is placed on a certain turntable; compressing said tire from above so as to shove a tire bead into the setback portion of the wheel; inserting a steel lever between the tire bead and the rim edge of the wheel so as to squeeze out of the wheel the tire bead and to hang the bead onto the bead suspender while at the same time to revolve the turntable so as to detach the tire bead from the wheel.

However, for its sporty appearance's sake, the recent passenger car tends to become short in height as if it touches the ground, due to which, a tire whose nominal aspect ratio is below 50% and the rigidity of which side portions is extremely high becomes popular. If such tire of small nominal aspect ratio as mentioned above is detached from the wheel by such prior tire replacement device as mentioned above, it not only requires hard labor on the part of the operators to squeeze out of the wheel a tire bead, but also it often occurs that a lever in use is displaced from the wheel so as to do damage on the latter or the operators get injured, which prior issues are to be solved by the present invention.

DISCLOSURE OF THE INVENTION

In view of the above inconveniences encountered with the prior art and in order to solve such prior issues as mentioned above, the present invention is to provide an apparatus for detaching a tire from the vehicle wheel and the same method, which apparatus and method enable a bead of even the tire of such small nominal aspect ratio as mentioned above, the rigidity of which side portions is high, to be detached from the rim edge of the wheel in a safe and efficient manner.

That is to say, the apparatus for detaching a tire from the vehicle wheel embodied in this invention is characterized in comprising a turntable which rotates by a driving portion and on the top surface of which a wheel, round which a tire is placed, is detachably mountable; an elevating rod disposed above said turntable such that it moves up and down to a destination; a tire bead separation shoe comprising a wedge portion to engage with a rim edge of the wheel so as to shove between said rim edge and tire bead and a tire bead fold-back portion disposed adjacent to said wedge portion; a thrusting rod provided with a claw at its tip end portion to insert said claw between the tire bead and the rim edge of the wheel and to squeeze out of the wheel the tire bead so as to move said bead onto the bead fold-back portion when the wedge portion of said shoe is shoved between the tire bead and the rim edge of the wheel and a boom arrangement to make said thrusting rod squeeze out of the wheel the tire bead.

Then, the method embodied in the present invention with the above apparatus in use is characterized in comprising the steps of lowering an elevating rod with regard to the wheel round which a tire is placed and which is fixed on a turntable so as to engage a tire bead separation shoe with a rim edge of the wheel and to shove a wedge portion between the rim edge of the wheel and the tire bead; operating a boom arrangement when said wedge portion is shoved between the tire bead and the rim edge of the wheel so as to insert a claw of a thrusting rod between the tire bead and the rim edge of the wheel and to squeeze out of the wheel the tire bead and to move the bead onto the tire bead fold-back portion of said separation shoe while revolving the turntable so as to detach the tire bead from the whole circumference of the rim edge of the wheel.

Hereinafter, the best mode for carrying out the invention is described in more details with reference to the accompanying drawings.

Figure 1:
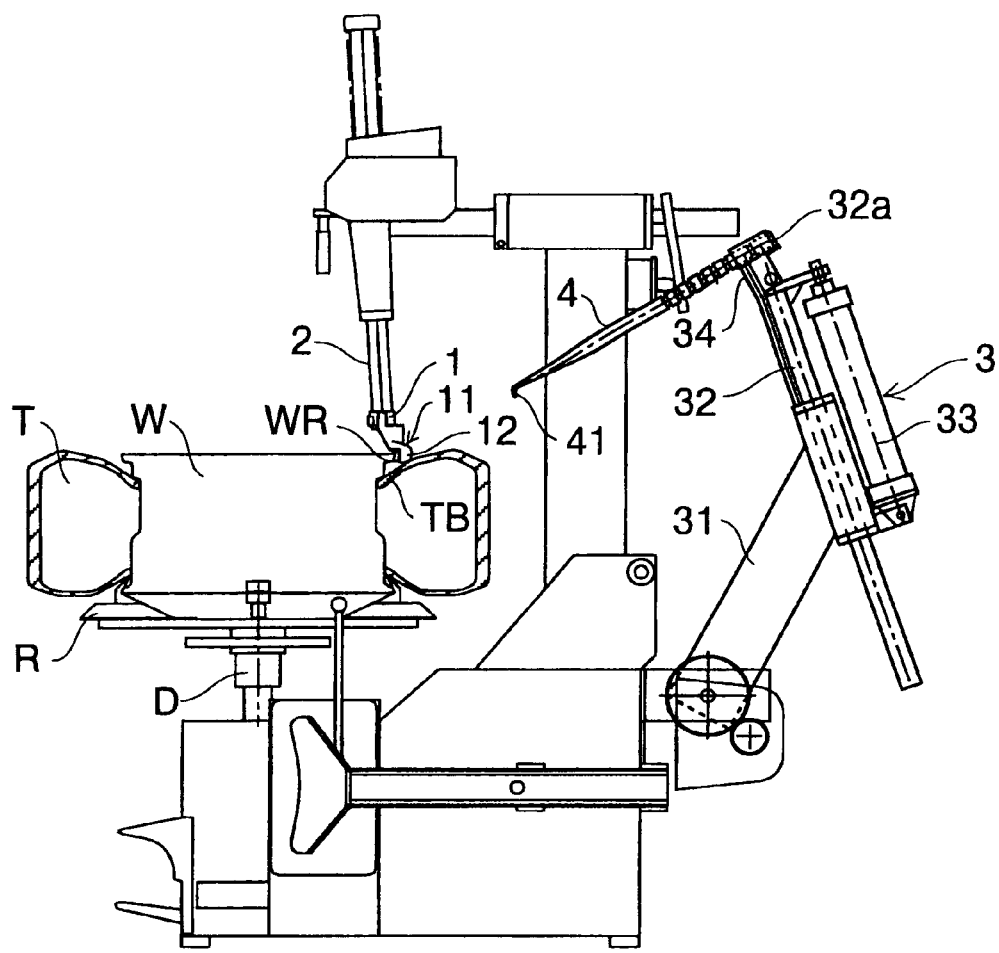
FIG. 1 is the whole frontal view of the apparatus of the first embodiment of the present invention to show its standby position.
Figure 2:
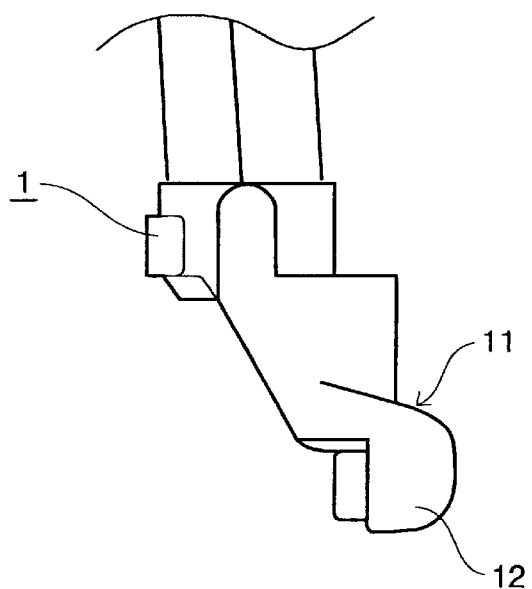
FIG. 2 comprises a partly enlarged side view (*a*) of the tire bead separation shoe of the above apparatus and a partly enlarged plan view (*b*) of the same.
Figure 2:
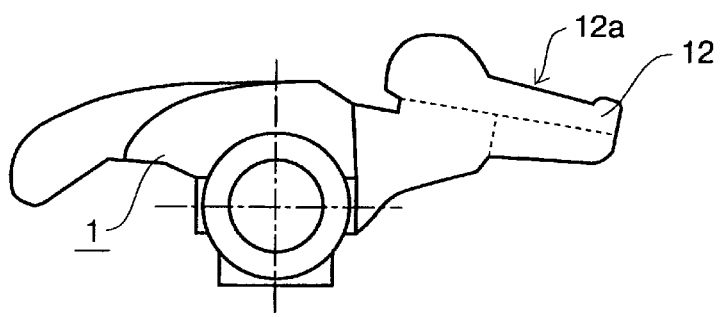
Figure 3:
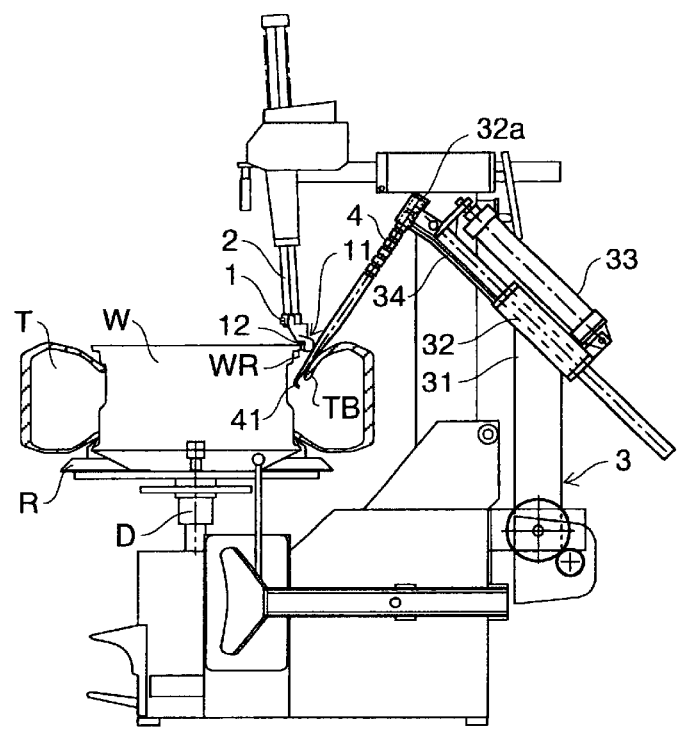
FIG. 3 comprises the whole frontal view (*a*) of the above apparatus to show the first step of the method for detaching a tire from the wheel and a partly enlarged view (*b*) to show the movement of the tire bead separation shoe and the thrusting rod of the same apparatus, respectively.
Figure 3:
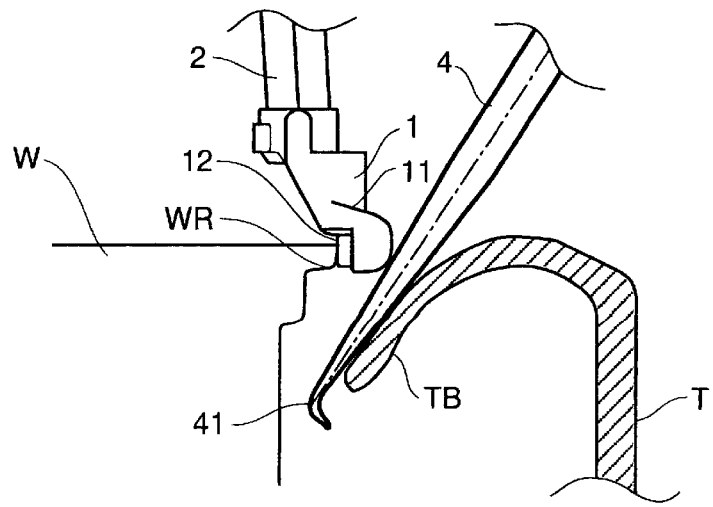
Figure 4:
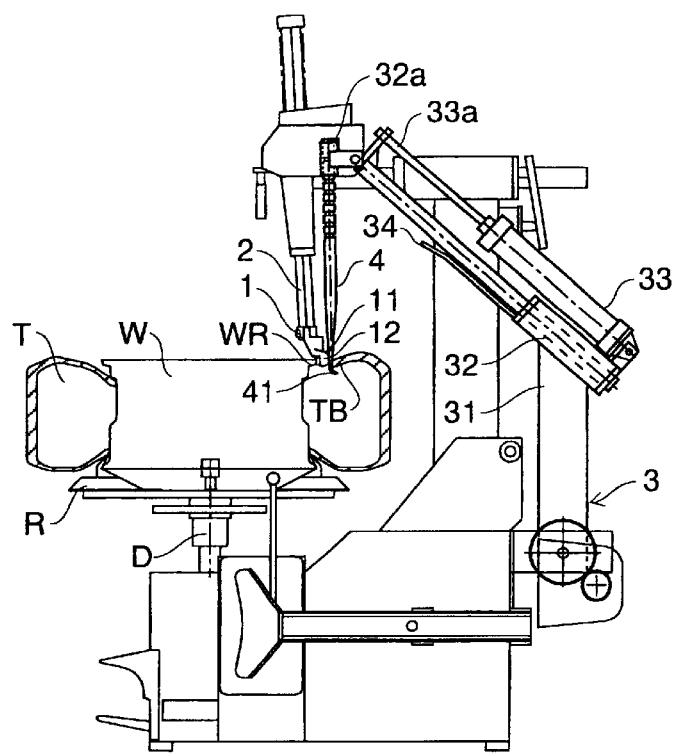
FIG. 4 comprises the whole frontal view (*a*) of the above apparatus to show the second step of the same method and a partly enlarged view (*b*) to show the movement of the tire bead separation shoe and the thrusting rod, respectively.
Figure 4:
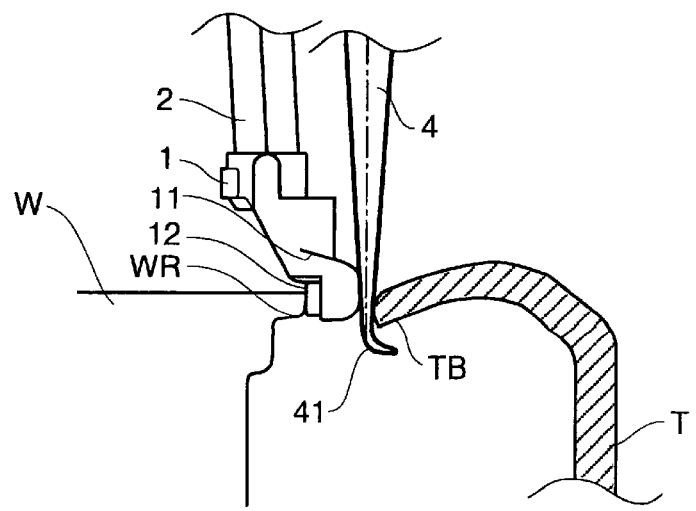
Figure 5:
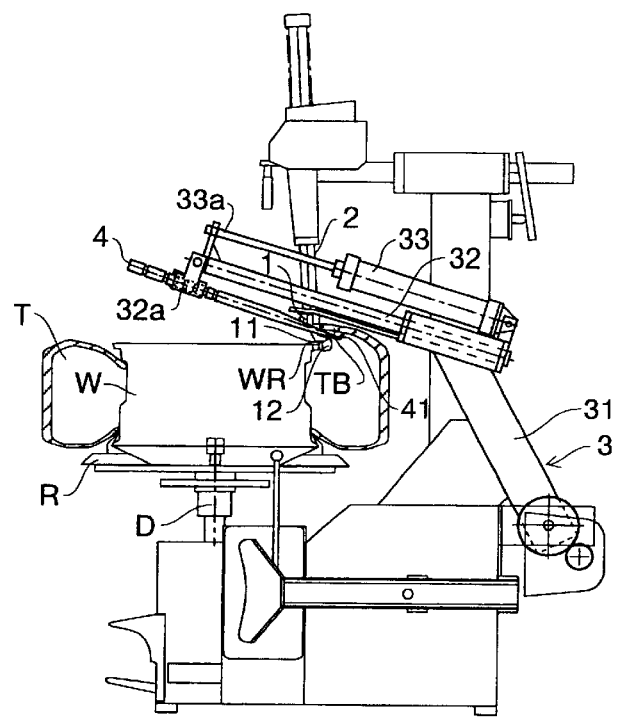
FIG. 5 comprises the whole frontal view (*a*) of the apparatus to show the third step of the same method and a partly enlarged view to show the movement of the tire bead separation shoe and the thrusting rod, respectively.
Figure 5:
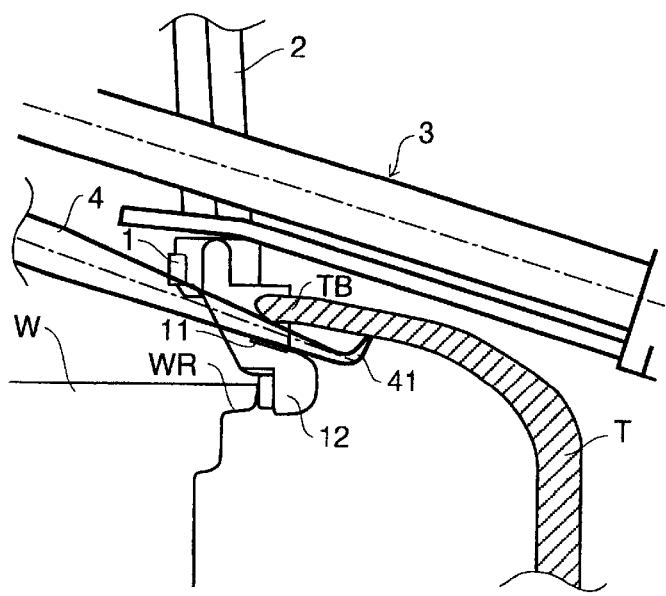

BEST MODE FOR CARRYING OUT THE INVENTION (First Embodiment)

The apparatus of the present embodiment is shown in FIGS. 1 to 6. In the drawings, numeral 1 indicates a tire bead separation shoe and numeral 2 indicates an elevating rod provided above a turntable R such that it moves up and down to a destination. This separation shoe 1 is an abutment member mounted at the lower end portion of the elevating rod 2 and comprises a tire bead fold-back portion 11 to suspend a tire bead TB thereon in engagement with a rim edge WR of a wheel W which is fixed on the turntable R and round which a tire T is placed and a wedge portion 12 to shove between the tire bead TB and the rim edge WR in contact with the former, which movements are shown in FIGS. 2(a) and (b).

Numeral 3 in the drawings indicates a boom arrangement, and comprises a boom 31 arranged such that it swings to a location in the circumference of the turntable R; a back and forth moving rod 32 provided at the top end side of said boom 31 such that it bends forwards and a cylinder 33 provided at the top end side of said boom in parallel with said rod 32 to impart a back-and-forth movement to said rod 32.

Numeral 4 in the drawings indicates a thrusting rod, which rod is made from steel while working as a lever, and at the tip end portion of which a claw 41 is provided.

Then, the operational steps taken by the apparatus of the present embodiment to detach a tire bead from a wheel, round which a tire is placed, are described below with reference to FIG. 1 as well as FIGS. 3 to 6.

FIG. 1 shows the state immediately before a tire bead is detached from the wheel, round which a tire is placed. In this state, the elevating rod 2 is lowered so that the separation shoe 1 provided at the lower end portion of the rod engages with the rim edge WR of the wheel W, round which the tire T is placed and which is fixed on the turntable R. In the meantime, the boom 31 is swung to a position as shown in FIGS. 3(a) and (b) so that it stands vertically with regard to the wheel while the claw 41 of the thrusting rod 4 axially supported on the top end portion of the boom arrangement 3 is abutted in between the rim edge WR of the wheel W and the tire bead TB so as to be shoved therebetween. At this stage, the backward movement of the rod 32 is constrained by a stopper 34 such that the claw 41 keeps its appropriate position between the rim edge WR and the tire bead TB.

Then, as shown in FIGS. 4(a) and (b), the claw 41 engages with the tire bead TB by abutting the back surface of the claw 41 onto the wedge portion 12 of the separation shoe 1 and extending the rod 32, which portion 12 works as a lever of first order, while keeping the boom 31 stand straight. It should be noted that the back and forth moving rod 32 is provided with a cylinder 33, according to the back and forth movement of which cylinder, the former changes its posture and position as required.

Then, as shown in FIGS. 5(a) and (b), the boom 31 is again swung and bent towards the wheel while keeping the rod 32 at its extended position. Correspondingly, the thrusting rod 4 slides through a holding sleeve 32a enclosing the former, and the back surface of the claw 41 is mounted into a guide groove 12a of the wedge portion 12 as shown in the partly enlarged view of FIG. 2(b), which groove works as a lever of first order when said claw squeezes out of the wheel the tire bead TB so as to mount said bead onto the bead fold-back portion 11.

Figure 6:
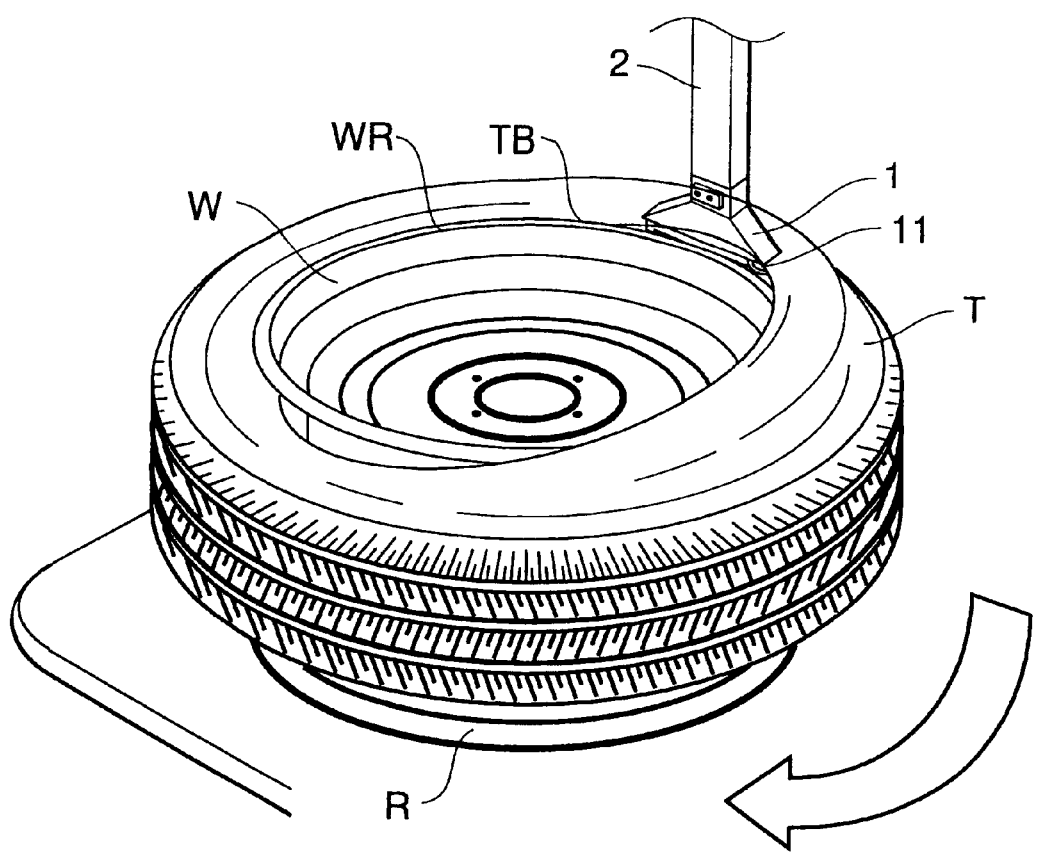
FIG. 6 is a perspective view to show the fourth step of the same method to rotate the turntable so as to detach the tire bead from the whole circumference of the wheel rim edge and FIG. 7 is a partly enlarged sectional view to show the characteristic parts of the apparatus of the second embodiment.

Finally, as shown in FIG. 6, when the driving portion D operates so as to rotate said turntable R, the tire bead TB suspended onto the bead fold-back portion 11 is squeezed out over the rim edge WR of the wheel. When the turntable R rotates once, the tire bead TB surrounding the whole circumference of the wheel is completely detached from the rim edge WR thereof.

(Second Embodiment)

Figure 7:
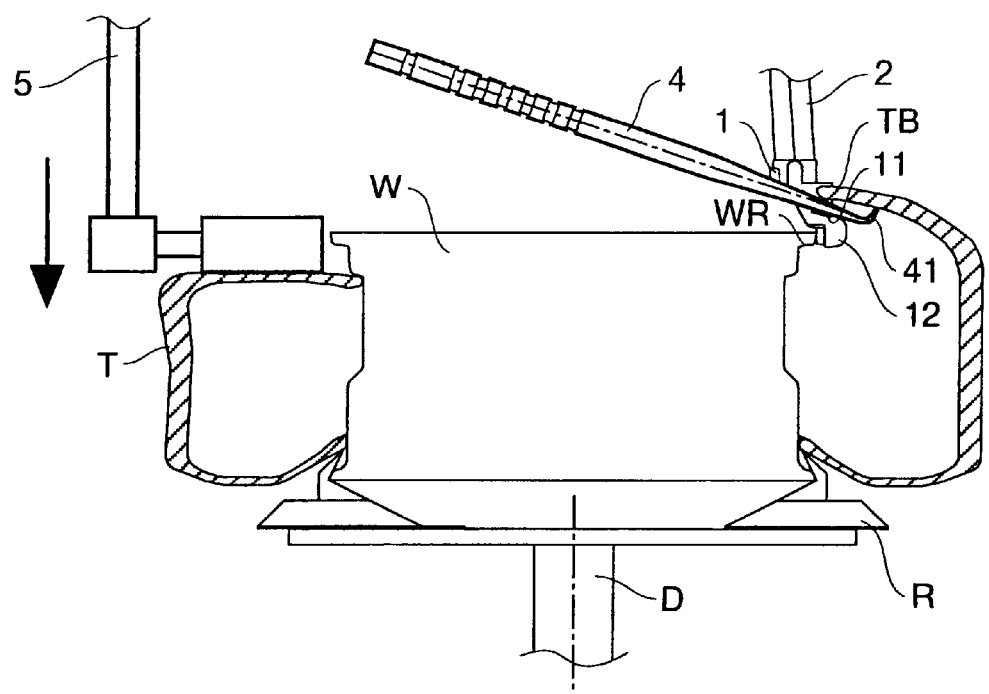

Then, the apparatus of the present embodiment is shown in FIG. 7. The difference between the apparatus of the first embodiment and this one lies in that a compression roller 5 is arranged in the diametrically opposite side to the beam arrangement or thrusting rod when the claw 41 squeezes out of the wheel the tire bead TB so as to mount the latter onto the bead fold-back portion 11. When the upper surface of a part of the tire T opposite to that of the tire into which the claw 41 is shoved is compressed down by said roller 5, this compression enforces the upper surface thereof to be set back into a recessed portion of the wheel. This relaxes the tension applied to the tire bead TB, into which the claw 41 is shoved, so that the claw is smoothly shoved into the tire bead TB, with the result that the efficiency of the operation improves.

The apparatus and the same method embodied in the present invention are substantially arranged as above, but the present invention is not limited to the above embodiments and may be modified into various manners within the scope of the accompanying claims. For instance, in the above embodiments, the thrusting rod 4 is axially supported at the tip end portion of the back-and-forth moving rod 32, but its installation on the boom arrangement 3 is not limited to the top end portion thereof. It may be installed in various locations of the boom arrangement according to the modifications of the design. The apparatus embodied in the present invention may be either assembled integrally with or attached to the existing tire replacement device, either of which belongs to the technical scope of the present invention.

INDUSTRIAL APPLICABILITY

As described above, the present invention enables the bead of even a tire of small nominal aspect ratio or the ratio of which sectional height to the sectional width thereof is small and the rigidity of which side portions is high, to be automatically detached from the vehicle wheel so as to improve on the safety and efficiency of the tire replacement work. Likewise, the thrusting rod to fold back the tire bead above the wheel rim edge takes the same trajectory course in use all the time, so that there is no case where the thrust rod is displaced from the wheel in operation so as to do damage on the wheel surface as in the prior art.

As mentioned above, the prior issues related to the conventional tire replacement work are solved once and for all by the present invention, the structural arrangement of which is very simple, so that its industrial applicability is very high.

What is claimed is:

1. An apparatus for detaching a tire (T) from a vehicle wheel (W) comprising a turntable (R) to rotate by means of a driving portion (D) and to detachably fix the wheel (W), round which the tire (T) is placed, thereon;

an elevating rod (2) arranged above said turntable (R) such that it moves up and down to a destination;

a tire bead separation shoe (1) mounted at the lower end portion of said elevating rod (2), wherein the shoe (1) having a wedge portion (12) to engage with a rim edge (WR) of the wheel (W) which is fixed on the turntable (R) so as to shove between the rim edge (WR) and a bead (TB) of said tire and a tire bead fold-back portion (11) provided adjacent to said wedge portion (12); and a thrusting rod (4) provided with a claw (41) at its tip end portion, wherein the claw (41) is shoved between said tire bead (TB) and rim edge (WR) of the wheel so as to squeeze out of the wheel the tire bead (TB) and to mount the bead onto the tire bead fold-back portion (11), when the wedge portion (12) of the tire bead separation shoe (1) is shoved between the tire bead (TB) and the rim edge (WR) of the wheel and a boom arrangement (3) to make the thrusting rod (4) squeeze out of the wheel (W) the tire bead (TB).

2. An apparatus according to claim 1 wherein the boom arrangement (3) comprises a boom (31) arranged such that it swings to a location in the vicinity of the turntable (R); a back-and-forth moving rod (32) arranged at a top end side of said boom (31) such that it bends forward; a cylinder (33) disposed at the top end side of said boom (31) in parallel with said back-and-forth moving rod (32), which cylinder (33) imparts a back and forth movement to said rod (32), wherein said boom arrangement (3) allows the claw (41) axially supported on the tip end portion of the back and forth moving rod (32), wherein said boom arrangement (3) allows the claw (41) axially supported on the tip end portion of the back and forth moving rod (32) to thrust between the wedge portion (12) and the tire bead (TB) as well as to squeeze out of the bead (TB) from the wheel (W).

3. An apparatus according to claim 2 wherein the back-and-forth moving rod (32) is slidably inserted into a holding sleeve (32a) fixed on the top end side of the boom (31) and said rod (32) moves back and forth according as said cylinder (33) advances and retracts.

4. An apparatus according to claim 2 wherein the boom arrangement (3) is provided with a stopper (34) to constrain the retraction speed of the back-and-forth moving rod (32).

5. An apparatus according to claim 2 wherein a compression roller (5) is arranged in the diametrically opposite side to the thrusting rod (4).

6. An apparatus according to claim 2 wherein a groove (12a) to receive the claw (41) of the thrusting rod into is provided on the wedge portion (12) of the tire bead separation shoe (1) so that the claw is guided through the groove upon penetration.

7. An apparatus according to claim 1 wherein the back-and-forth moving rod (32) is slidably inserted into a holding sleeve (32a) fixed on the top end side of the boom (31) and said rod (32) moves back and forth according as said cylinder (33) advances and retracts.

8. An apparatus according to claim 7 wherein the thrusting rod (4) is axially supported on the tip end portion of the cylinder (33) of the boom arrangement.

9. An apparatus according to claim 8 wherein a compression roller (5) is arranged in the diametrically opposite side to the thrusting rod (4).

10. An apparatus according to claim 8 wherein a groove (12a) to receive the claw (41) of the thrusting rod into is provided on the wedge portion (12) of the tire bead separation shoe (1) so that the claw is guided through the groove upon penetration.

11. An apparatus according to claim 7, wherein the boom arrangement (3) is provided with a stopper (34) to constrain the retraction speed of the back-and-forth moving rod (32).

12. An apparatus according to claim 7 wherein a compression roller (5) is arranged in the diametrically opposite side to the thrusting rod (4).

13. An apparatus according to claim 7 wherein a groove (12a) to receive the claw (41) of the thrusting rod into is provided on the wedge portion (12) of the tire bead separation shoe (1) so that the claw is guided through the groove upon penetration.

14. An apparatus according to claim 1 wherein the boom arrangement (3) is provided with a stopper (34) to constrain the retraction speed of the back-and-forth moving rod (32).

15. An apparatus according to claim 14 wherein a compression roller (5) is arranged in the diametrically opposite side to the thrusting rod (4).

16. An apparatus according to claim 14 wherein a groove (12a) to receive the claw (41) of the thrusting rod into is provided on the wedge portion (12) of the tire bead separation shoe (1) so that the claw is guided through the groove upon penetration.

17. An apparatus according to claim 1 wherein a compression roller (5) is arranged in the diametrically opposite side to the thrusting rod (4).

18. An apparatus according to claim 17 wherein a groove (12a) to receive the claw (41) of the thrusting rod into is provided on the wedge portion (12) of the tire bead separation shoe (1) so that the claw is guided through the groove upon penetration.

19. An apparatus according to claim 1 wherein a groove (12a) to receive the claw (41) of the thrusting rod into is provided on the wedge portion (12) of the tire bead separation shoe (1) so that the claw is guided through the groove upon penetration.

20. A method for detaching a tire (T) from a vehicle wheel (W) comprising the steps of engaging a tire bead separation shoe (1) with a rim edge (WR) of the wheel by descending an elevating rod (2) with regard to the wheel, round which the tire is placed and which is fixed on a turntable (R) so as to shove a wedge portion (12) between the rim edge and a tire bead (TB); operating a boom arrangement (3) when the wedge portion (12) is shoved between the tire bead (TB) and the rim edge (WR) of the wheel, wherein a claw (41) of a thrusting rod is shoved between the tire bead and the rim edge and the tire bead is squeezed out of the wheel so as to be mounted on a bead fold-back portion (11) of the separation shoe while said turntable (R) is revolved so as to detach the whole circumference of the tire bead (TB) from the rim edge (WR) of the wheel.

* * * * *